United States Patent [19]
Uota

[11] 3,902,074
[45] Aug. 26, 1975

[54] ENGINE INTERLOCKING DEVICE
[75] Inventor: Kosaku Uota, Himeji, Japan
[73] Assignee: Mitsubishi Denki Kabushiki Kaisha, Japan
[22] Filed: Dec. 19, 1973
[21] Appl. No.: 426,080

[30] Foreign Application Priority Data
Dec. 19, 1972 Japan............... 47-127497

[52] U.S. Cl............. 307/10 SB; 340/52 E; 340/278; 180/82 C
[51] Int. Cl.............................. B60r 21/10
[58] Field of Search............... 340/52 E, 52 R, 278; 307/20 SB; 180/82 C

[56] References Cited
UNITED STATES PATENTS
3,742,448   6/1973   Motz................... 340/52 E

*Primary Examiner*—Herman Hohauser
*Attorney, Agent, or Firm*—Oblon, Fisher, Spivak, McClelland & Maier

[57] ABSTRACT

An engine interlocking device for preventing the starting of an engine when the driver does not use a safety seat belt under normal conditions by detecting the proper use of the seat belt provided at each seat. The engine interlocking device however allows the engine to be started without the proper use of the seat belt only during an emergency when for example, the engine stops while the key switch in ON. This is provided by means of a unique yet simple structure comprising a timing circuit and a logic circuit.

2 Claims, 2 Drawing Figures 3,902,074

ENGINE INTERLOCKING DEVICE

BACKGROUND OF THE INVENTION

1. Field of the Invention

This invention relates to an engine interlocking device for detecting the condition of use of the safety belt provided at each seat in a car, and more particularly to such a device wherein the engine is prevented from being started when the safety belt is not properly used by the driver or passenger.

2. Description of the Prior Art

It is customary to provide seat belts as safety devices for the driver and passengers of a car. Recently, in order to increase the rate of proper use of seat belts by the driver or passenger, it has been proposed that the engine be prevented from starting without the proper use of the seat belt, or perhaps an alarm such as a buzzer or a lamp be actuated when the seat belt is disconnected during driving.

However, it is often necessary to start the engine even without the proper use of seat belts when an emergency occurs, such as when the engine stops while the ignition switch is turned on. Since it takes some time to connect the seat belt, an accident may ensue. Accordingly, the engine should be startable without the proper use of the seat belt under such conditions, since the driver has no intention of getting out of the car and the car runs continuously when the driver does not turn off the ignition switch. It has also been a requirement that the engine be startable within a limited time from the turning off of the ignition switch.

SUMMARY OF THE INVENTION

It is therefore an object of the present invention to provide a new and improved engine interlocking device wherein an engine may be startable without the proper use of seat belts when the ignition switch is not turned off after the engine stops or during a limited time after the turning off of the ignition switch.

It is another object of the present invention to provide an economical engine interlocking device having a unique and yet simple structure comprising a timing circuit and a logic circuit.

The foregoing and other objects are attained in accordance with one aspect of the present invention through the provision of an engine interlocking device which comprises a flip-flop circuit having two inputs responding to a signal indicative of the turning on or off of an ignition switch of a vehicle and to another signal switch which responds to the starting or stopping of the engine, a timing circuit including a resistor and a condenser which is connected to an output terminal of a flip-flop circuit, a logic circuit for receiving the output of said timing circuit and a signal which responds to the condition of use of a seat belt, and an engine start controlling device comprising a switching element controlled by the output of the logic circuit and a relay actuated when the switching element is turned on to open an excitation circuit of a starter switch coil, whereby the engine may be started after being stopped when said ignition switch is on, or during a predetermined time set by said timing circuit after turning off the switch after the engine stops.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which.

DETAILED DESCRIPTION OF A PREFERRED EMBODIMENT

Figure 1:
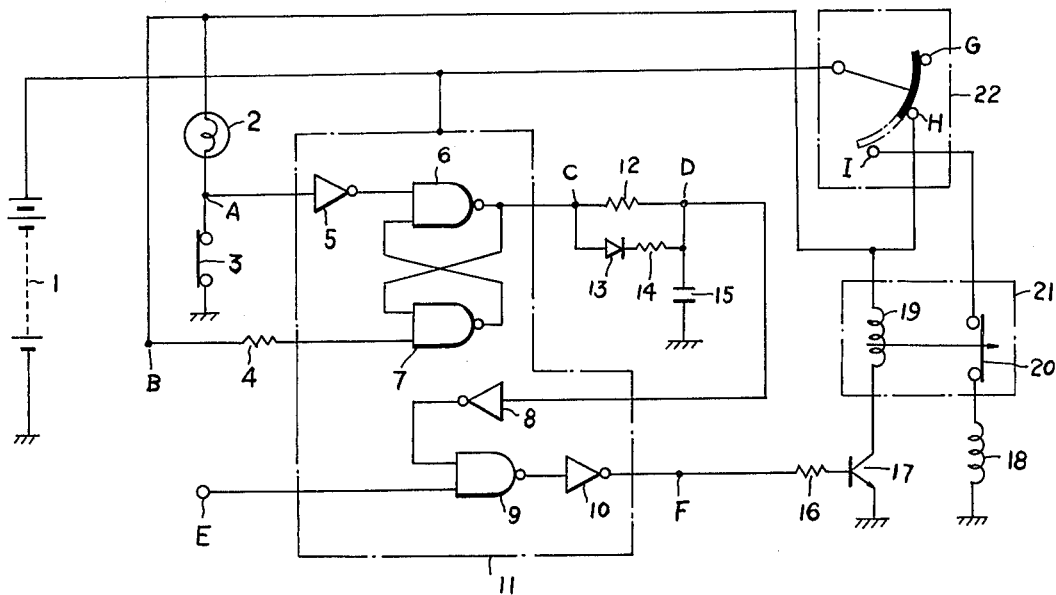
FIG. 1 is a schematic diagram of a preferred embodiment of an electrical circuit comprising the engine interlocking device of the present invention.

Referring now to the drawings, wherein like reference numerals designate identical or corresponding parts throughout the several views, and more particularly to FIG. 1 thereof, the preferred embodiment electrical circuit is seen to comprise a power source 1 such as a battery, a charging lamp 2, a switch 3 which turns on when the engine stops and turns off when the engine starts and a resistor 4. The circuit further includes inverters 5, 8 and 10, and NAND gates 6, 7 and 9 each having two inputs, which may be formed as integrated circuit 11. The circuit also includes resistors 12, 14 and 16, a diode 13, a condenser 15, a transistor 17, a starter switch coil 18 for a starter (not shown) a relay 21 consisting of relay coil 19 and relay contact 20, and an ignition switch 22. A timing circuit is formed by the resistor 12 and the condenser 15. The symbols A through I represent various terminals of the electric circuit of the preferred embodiment. The relay 21 is connected to a circuit connecting the starter switch coil 18 and the power source 1. When a seat belt is not being used under normal conditions, the starting of the engine is prevented by the switching of said circuit. When the engine starts, the starter terminal I of the ignition switch 22 is connected and the relay switch 20 is turned on to excite the starter switch coil 18.

The characteristic features of the present invention are to detect the stopping of the engine by the switch 3, and to turn off the ignition switch 22 after the engine stop is detected by a flip-flop circuit, and to set a constant time To by the timing circuit after turning off the ignition switch 22. The NAND gates 6 and 7 form the flip-flop circuit.

Figure 2:
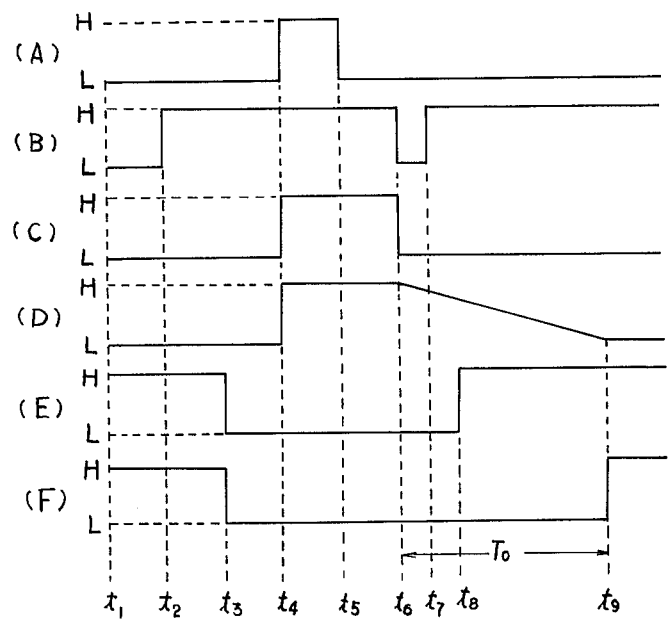
FIG. 2 are timing graphs for illustrating the operation of the electrical circuit of FIG. 1.

The operation of the circuit of FIG. 1 will be illustrated by referring to the timing diagrams of FIG. 2, wherein A through F represent voltage waveforms at each of the terminals A through F of FIG. 1. At the time $t_1$, the switch 3 is closed as the engine stops, and the terminal A is at ground potential (hereinafter referred to as state L). In this state, the ignition switch 22 is connected only to the OFF terminal G. Accordingly, the ignition terminal H is L, and the terminal B is L.

The integrated circuit 11 is usually connected to the power source 1. At the time $t_1$, the terminal C is L and the terminal D, which is one end of the condenser 15, also is L. Accordingly, the output of the inverter 8 is at a level equal to the power voltage (hereinafter referred to as H). When the terminal E is H, the output of NAND gate 9 is H. In the following discussion, a signal indicating proper use of a seat belt is applied to the terminal E, and it will be considered that when the terminal E is H, it indicates an improper use of a seat belt and when the terminal E is L, it indicates the proper use of the seat belt. Accordingly, at the time $t_1$, the terminal E is H and the terminal F is also H to feed a base current for the transistor 17.

At the time $t_2$, when the ignition switch 22 is connected to an ignition terminal H, the relay coil 19 is driven by the transistor 17, whereby the normally closed relay contact 20 is turned off or opened. After such time, the starter switch coil 18 will not be excited by connecting the ignition switch 22 to the starter terminal I, whereby the starting of the engine will be prevented. When the seat belt is properly connected under normal conditions at the time $t_3$, the signal at the terminal E is L, and accordingly the output of the NAND gate 9 is H, and the base of the transistor 17 is L. Accordingly, the transistor 17 will be turned off to turn on the relay contact 20, whereby the starter is rendered energizable.

When the starter is started at the time $t_4$ to drive the engine (not shown), the switch 3 is turned off. Accordingly, the terminal C is H and the condenser 15 will be charged through the diode 13 and the resistor 14. When the time constant is quite small, condenser 15 is immediately charged whereby the terminal D becomes H. Accordingly, the output of NOT gate 8 becomes L, and the output of NAND gate 7 is L and both inputs of NAND gate 6 are respectively L.

When the engine is stopped at the time $t_5$, the switch 3 is turned on and the output of inverter 5 is H. However, the output of NAND gate 7 is L, whereby the output of NAND gate 6 is kept at H. Accordingly, as long as the ignition switch 22 is positioned on the ignition terminal H after the engine stops, the terminal B is H, and the output of NAND gate 7 is L, and the terminal C is H.

When the ignition switch 22 is turned off from the time $t_6$ to $t_7$, the terminal B is L, the output of NAND gate 7 is H, both inputs of NAND gate 6 are H, and the terminal C is L.

After time $t_6$, the charge on the condenser 15 is discharged through the resistor 12. The time constant is determined by the values of the condenser 15 and the resistor 12 of the timing circuit. The charge on the condenser 15 will be discharged until the time $t_9$ when the time constant is To. Accordingly, if the proper connection of the seat belt is changed to an improper connection at the time $t_8$, the terminal E is H, and the terminal D is H whereby the output of inverter 8 is L. Accordingly, the output of NAND gate 9 is H and the terminal F is L, whereby the transistor 17 is turned off and the engine is startable without the proper use of the seat belt.

When the discharge of the condenser 15 is completed at the time $t_9$, the terminal D is L and the output of inverter 8 is H, and accordingly both of the inputs of NAND gate 9 are H and the terminal F is H whereby the transistor 17 is turned on and the relay contact 20 is turned off to prevent the engine from being started.

According to the present invention, the engine may be started without the proper use of the seat belt as long as the ignition switch 22 is turned off after the engine stops. Moreover, when the ignition switch 22 is turned off after the engine stops, the engine may be started without the proper use of the seat belt for a predetermined time (for example, several minutes).

Accordingly, it is possible to start the engine without concern as to the condition of the seat belt of a driver or passenger during an emergency, whereby an accident may be prevented. The device of the present invention is seen to have a unique yet simple structure using a logic circuit and a timing circuit, so that it is quite advantageous and economical to produce.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. An engine interlocking device, which comprises:
    a starter switch coil connected through an ignition switch to a power source,
    a first inverter circuit whose input terminal is connected through said ignition switch to said power source and is connected through a switch which responds to the starting or stopping of said engine to ground;
    a flip-flop circuit comprising a first NAND circuit having an input terminal connected through said ignition switch to said power source and second NAND circuit having an input terminal connected to the output terminal of said first inverter circuit;
    a timing circuit comprising a condenser connected to the output terminal of said second NAND circuit of said flip-flop circuit;
    a second inverter circuit whose input terminal is connected to the output terminal of said timing circuit;
    a third NAND circuit having one input terminal for receiving a signal in response to the condition of connection of a seat belt and whose other input terminal is connected to the output terminal of said second inverter circuit;
    a third inverter circuit connected to the output terminal of said third NAND circuit;
    a switching element controlled by the output of said third inverter circuit; and
    a relay for opening an excitation circuit of said starter switch coil by actuating at the time said switching element is turned on said relay being connected through said ignition switch to said power source; whereby said engine may be started after it stops provided said ignition switch is turned off and then on after a predetermined interval.

2. An engine ignition switch interlocking device for preventing the starting of the engine of a vehicle under normal conditions when a seat belt is unfastened which comprises:
    a flip-flop circuit having two inputs for receiving a first signal in response to the turning on or off of said ignition switch and a second signal in response to the starting or stopping of said engine, said flip-flop circuit including a first NAND circuit having an input terminal connected through said ignition switch to a power source and a second NAND circuit having one input terminal connected to an inverter circuit, wherein the input terminal of said inverter circuit is connected through said ignition switch to said power source and is also connected to ground through a switch that responds to starting or stopping of said engine,
    a timing circuit connected to an output of said flip-flop circuit,
    a logic circuit having two inputs connected to an output of said timing circuit and an output responsive to the condition of said seat belt;
    a switching element controlled by the output of said logic circuit; and
    a relay for opening an excitation circuit of a starter switch coil actuated at the time said switching element is turned on.

\* \* \* \* \*